(12) United States Patent
Warner et al.

(10) Patent No.: US 7,478,103 B2
(45) Date of Patent: Jan. 13, 2009

(54) METHOD FOR CLUSTERING AUTOMATION AND CLASSIFICATION TECHNIQUES

(75) Inventors: Douglas K. Warner, Gallatin, MT (US); James Neal Richter, Gallatin, MT (US); Bikramjit Banerjee, Gallatin, MT (US)

(73) Assignee: Rightnow Technologies, Inc., Bozeman, MT (US)

( * ) Notice: Subject to any disclaimer, the term of this patent is extended or adjusted under 35 U.S.C. 154(b) by 0 days.

(21) Appl. No.: 10/226,542

(22) Filed: Aug. 22, 2002

(65) Prior Publication Data

US 2003/0061242 A1     Mar. 27, 2003

Related U.S. Application Data

(60) Provisional application No. 60/314,796, filed on Aug. 24, 2001.

(51) Int. Cl.
*G06F 7/00* (2006.01)
(52) U.S. Cl. .................................... 707/101; 707/10
(58) Field of Classification Search .......... 707/1–104.1, 707/200–206; 706/47, 48, 56, 60, 61, 12, 706/45, 46; 715/532
See application file for complete search history.

(56) References Cited

U.S. PATENT DOCUMENTS

| | | | | |
|---|---|---|---|---|
| 5,619,709 | A * | 4/1997 | Caid et al. .................. | 715/532 |
| 5,640,553 | A * | 6/1997 | Schultz ......................... | 707/5 |
| 5,974,412 | A * | 10/1999 | Hazlehurst et al. ............. | 707/3 |
| 6,012,058 | A * | 1/2000 | Fayyad et al. .................. | 707/6 |
| 6,078,924 | A * | 6/2000 | Ainsbury et al. ............ | 707/101 |
| 6,101,515 | A * | 8/2000 | Wical et al. ................. | 715/531 |
| 6,263,334 | B1 * | 7/2001 | Fayyad et al. .................. | 707/5 |
| 6,263,337 | B1 * | 7/2001 | Fayyad et al. .................. | 707/6 |
| 6,289,353 | B1 * | 9/2001 | Hazlehurst et al. .......... | 707/102 |
| 6,289,354 | B1 * | 9/2001 | Aggarwal et al. ........ | 707/104.1 |
| 6,449,612 | B1 * | 9/2002 | Bradley et al. ................. | 707/6 |
| 6,665,655 | B1 * | 12/2003 | Warner et al. .................. | 707/2 |

OTHER PUBLICATIONS

Lawrence J. Mazlack, Approximate Clustering In Association Rules, 2000, IEEE, 256-260.*
Tian Zhang et al., An Efficient Data Clustering Method for Very Large Databases, 1996, SIGMOD, ACM, 103-114.*

(Continued)

*Primary Examiner*—Shahid Alam
*Assistant Examiner*—Jean B Fleurantin
(74) *Attorney, Agent, or Firm*—Husch Blackwell Sanders LLP

(57) ABSTRACT

A method and system for use in an information retrieval system that provides related informational items that can be automatically classified and summarized in a hierarchical manner. The system comprises the steps and means for the presentation and analysis of mined data through the application of four distinct processes, namely, feature selection, clustering, classification and summarization. The implementation of each of these techniques is a single process without regard to order. Individual informational items are analyzed, and relevant features extracted. Individual groups of informational items, otherwise known as clusters, are identified, and rules are determined to allow the assignment of informational items to the previously mentioned groups. Descriptive and meaningful titles are then identified for the groups. Various methods of presenting searched information to an end user are also provided. A method of adaptive clustering is also provided.

5 Claims, 9 Drawing Sheets

FIG. 1.

OTHER PUBLICATIONS

A.K. Jain et al., Data Clustering: A Review, 1999, ACM, 264-293.*

Chih-Ping Wei et al., A mining-based category evolution approach to managing online document categories, Jan. 3-6, 2001, IEEE, 1-10.*

Jacobs, P.S., Using statistical methods to improve knowledge-based news categorization, Apr. 1993, IEEE, vol. 8, 13-22.*

Richard O. Duda, et al., *Pattern Classification And Scene Analysis*, A Wiley-Interscience Publication, p. 189.

Sergios Theodoridis, et al., *Pattern Recognitions*, Academic Press, p. 351.

* cited by examiner

Fully Exploded

Homo Genus Cluster Collapsed

Hominidae Family Cluster Collapsed

Primate Order Cluster Collapsed

101 Document 1024
Germany
Location: Central Europe, bordering the North Sea and the Baltic Sea between
 The Netherlands and Poland, south of Denmark.
Population: 81,337,541 (July 1995 est.)
Capital: Berlin
 Note: the shift from Bonn to Berlin will take place over a period
 of years with Bonn retaining many administrative functions and several
 ministries.
Area: Total: 356,910 km^2 Land: 349,520 km^2
Comparative Area: Slightly smaller than Montana
Note: Includes the formerly separate Federal Republic of Germany, the German
 Democratic Republic and Berlin following formal unification on 3 October 1990
Airports: 660
Currency: 1 Deutsche Mark (DM) = 100 pfennige

102 Document 1063
Italy
Location: Southern Europe, a peninsula extending into the central Mediterranean Sea,
 northeast of Tunisia
Population: 57,634,327 (July 2000 est.)
Capital: Rome
Area: Total: 301,230 km^2 Land: 294,020 km^2 Water: 7,210 km^2
Comparative Area: Slightly larger than Arizona
Note: Includes Sardinia and Sicily
Airports: 136
Currency: 1 Italian Lira (Lit) = 100 centesimo

FIG. 8A.

| | |
|---|---|
| Europe | 400 |
| Rome | 190 |
| Berlin | 110 |
| London | 105 |
| Exchange Rates | 100 |
| Airports | 75 |
| Birth rate | 10 |
| Ports | 25 |
| Economy | 5 |

FIG. 8B.

Example Features for Document 1024

| | |
|---|---|
| Central Europe | 20 |
| North Sea | 20 |
| Baltic Sea | 20 |
| Sea | 20 |
| Poland | 10 |
| Denmark | 10 |
| The Netherlands | 10 |
| Germany | 10 |
| located | 5 |
| bordering | 5 |

FIG. 9B.

Germany is located in Central Europe, bordering the North Sea and the Baltic Sea between The Netherlands and Poland, south of Denmark.

| | | |
|---|---|---|
| Germany | NP0 | (proper noun) |
| is | VBZ | (-s form of the verb "be") |
| located | VVN | (past participle form of lex. verb) |
| in | PRP | (preposition) |
| Central | AJ0 | (adjective) |
| Europe | NP0 | |
| bordering | VVG | (-ing form of lexical verb) |
| the | AT0 | (article) |
| North | NP0 | |
| Sea | NP0 | |
| and | CJC | (coordinating conjunction) |
| the | AT0 | |
| Baltic | NP0 | |
| Sea | NP0 | |
| between | PRP | |
| The | AT0 | |
| Netherlands | NP0 | |
| and | CJC | |
| Poland | NP0 | |
| south | NN1 | (singular noun) |
| of | PRF | (the preposition "of") |
| Denmark | NP0 | |

FIG. 9A.

METHOD FOR CLUSTERING AUTOMATION AND CLASSIFICATION TECHNIQUES

CROSS-REFERENCE TO RELATED APPLICATIONS

This application claims priority to U.S. Serial No. 60/314,796, filed Aug. 24, 2001, which is fully incorporated herein by reference.

TECHNICAL FIELD

The present invention generally relates to information search and retrieval systems. More particularly, the present invention relates to the automated clustering, classification and summarization of related informational items during an information retrieval session.

BACKGROUND ART

A database is useful only if a desired item can be efficiently found and retrieved therefrom. To locate and retrieve a desired information item in an information database, a search of the database, e.g., based on a keyword or a text string, may be required. The search typically involves finding entries matching a keyword (or string) in an index. The index is created by parsing information items into searchable words and identifying the location in which the word appears in the database. For example, the Internet, or the world wide web (WWW), may be considered as a very large database of information items, in the form of web pages, distributed over a very wide network. Currently available search engines, e.g., the YAHOO™, EXCITE®, and the like, maintain an index of a large fraction of the content of the WWW parsed into searchable words and corresponding locations, e.g., the Uniform Resource Locators (URL).

However, as the size of a database becomes very large, e.g., the number of web pages in the WWW is currently in the hundreds of millions and growing fast, a user may have to navigate through, select and review a significant number of informational items before arriving at the one desired informational item. The navigation through the ever-increasing number of informational items often proves difficult and requires a considerable investment of time, effort and sometimes even good fortune, on the part of the user.

Unfortunately, in a conventional information retrieval system, even after finding the sought after information once, it is difficult or cumbersome at best to find the same information again. Unless a user remembers the location of the once located information, the user may have to follow the same navigational trail again. Thus expending yet another considerable investment of time and effort. Moreover, a subsequent user looking for the same information would have to duplicate the time and effort, i.e., must re-invent the wheel in order to find the information. The subsequent user often ends an information retrieval session in frustration without finding the desired information. This duplicated effort is wasteful and inconvenient, and thus diminishes the usefulness of the database.

Moreover, in a conventional help information retrieval system, the help information items are fixedly mapped, requiring a user to always follow the same help menu path to arrive at a particular help item of interest. Even if the path is ultimately proven to be inefficient, the inefficient path, nevertheless, must always be followed in order to retrieve that particular item. The efficiency of a particular path that is taken may depend on the context in which the help item is sought. Because the fixed mapping cannot account for the various contexts, it is inefficient, and thus diminishes the usefulness of the help information retrieval system.

Thus, what is needed is an efficient system and method for the convenient and economical retrieval of a desired informational item in an informational retrieval system such as an improved web search engine and improved method of presenting searched information.

What is also needed is an automated system that extracts features, clusters, classifies and categorizes information to enhance the accuracy and efficiency of the information retrieval system.

SUMMARY OF INVENTION

The present invention utilizes a method and apparatus for use in an information retrieval system that provides related informational items that can be automatically classified and summarized in a hierarchical manner. This system comprises the steps and means for the presentation and analysis of mined data through the application of three distinct processes, namely clustering, classification and summarization. The implementation of these techniques occurs without regard to the order in which the processes are implemented, so long as all three techniques are applied in an information retrieval session. Individual groups of informational items are identified. Rules are determined to allow the assignment of informational items to the previously mentioned groups. Descriptive and meaningful titles are then identified for the groups.

In addition, in accordance with the principles of the present invention, an information retrieval system comprises a plurality of informational items and a method of presenting searched information to an end user.

Also, in accordance with the principles of the present invention, any combination of readily available natural language feature selection, clustering, classification and summarizing algorithms into a single process, will satisfy the objective of enhancing the process of automated classification in an information retrieval system.

DESCRIPTION OF DRAWINGS

Features and advantages of the present invention will become apparent to those skilled in the art from the following description with reference to the drawings, in which:

FIG. 8A is an exemplary pictorial representation of a small set of documents and associated attributes;

FIG. 8B is an exemplary pictorial representation of a list of ranked terms;

FIG. 9A is an exemplary pictorial representation of the output of a natural language part of speech tagger;

FIG. 9B is an exemplary pictorial representation of the extracted features of an exemplary document;

DETAILED DESCRIPTION OF PREFERRED EMBODIMENTS

For illustrative purposes, the principles of the present invention are described by referring mainly to an exemplary embodiment, particularly with references to the Internet and the WWW as the exemplary databases of informational items. However, one of ordinary skill in the art would readily recognize that the same principles are equally applicable to, and can be implemented in, other informational databases, and that any such variation would not depart from the true spirit and scope of the present invention.

Figure 1:
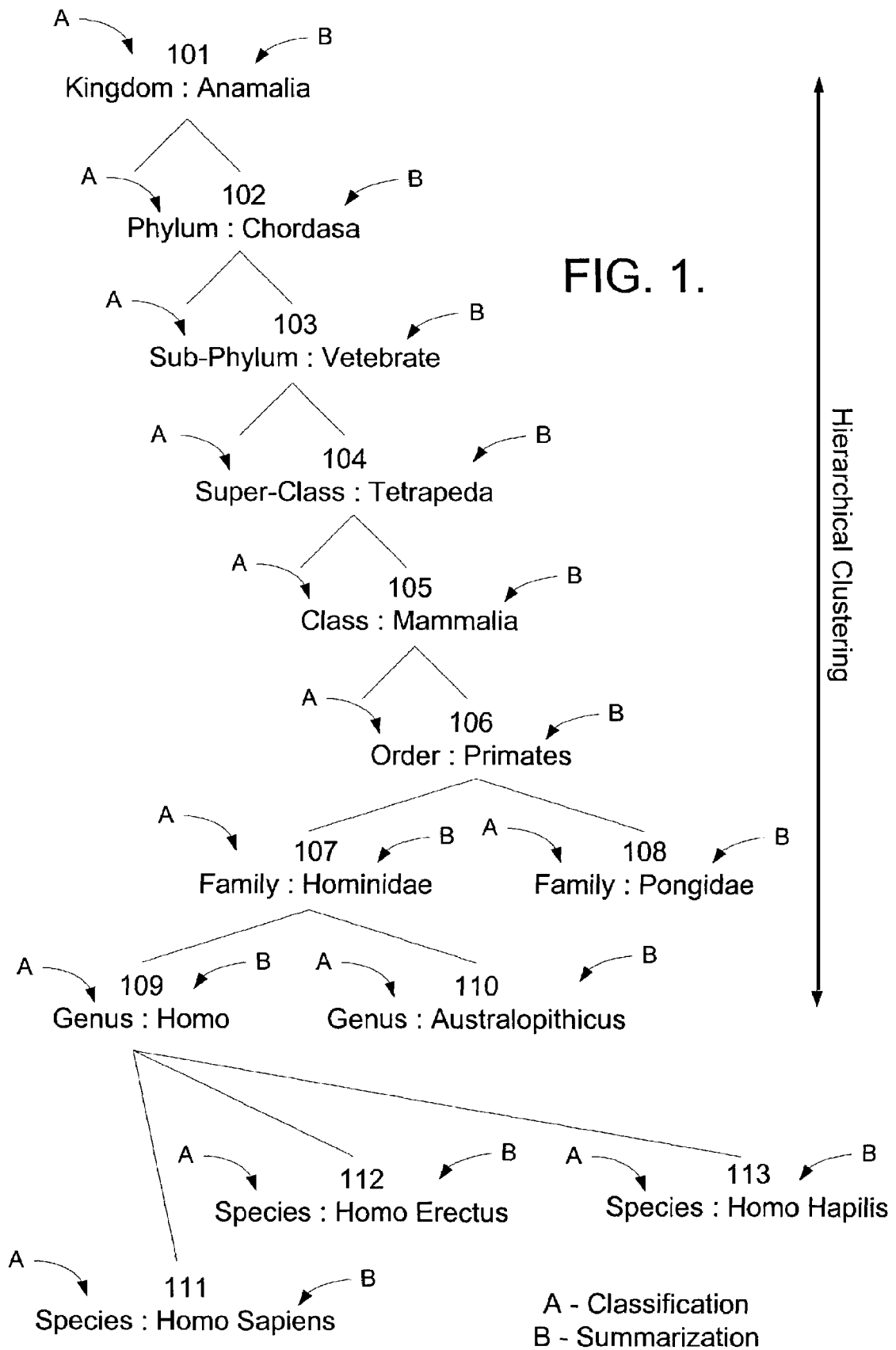
FIG. 1 is a pictorial representation of the relationship between hierarchical clustering, classification and summarization of some informational items.

With reference to FIG. 1, a hierarchical relationship that exists between the clustering, classification and summarization of informational items is illustrated. Specific groupings of data are identified by the method of the present invention through placement of data into a hierarchical cluster 100 by a process of classification. Each of these groupings or clusters are then named by a process of summarization 110-113. As shown, informational items depicted by the letter A are representative of a classification 101A-113A, and the informational items depicted by the letter B are representative of a summarization 101B-113B. The entire structure shown in FIG. 1 represents the hierarchical clustering of the informational items 100.

Hierarchical clustering generates sub-groupings within clusters, which result in the classification rules and the summaries. Classification involves taking new information and sorting that information into a set of identified categories. In a traditional clustering algorithm, such as BIRCH, hierarchical representations are provided and information is generated that proves useful for classification and summarization. The key points that define a bin of informational items are used to calculate the distance between informational items. Informational items are stored with the bin to aid in efficiently determining the distance between new unclustered information items and those that are already clustered into bins. The method of the present invention incorporates the key points methodology into subsequent classification and summarization approaches.

In an embodiment of the present invention, each of the key points of informational items are augmented with a ranking score. A ranking score could be, for example, a word score that increases with each repetitive occurrence of a word in a document. The score may also be further increased if the word also appears in the title. The ranking scores can additionally be integrated with other subsequent processing of the types discussed above. For example, scoring better identifies the most important terms in a document or cluster of documents for subsequent classification or summarization.

Figure 2:
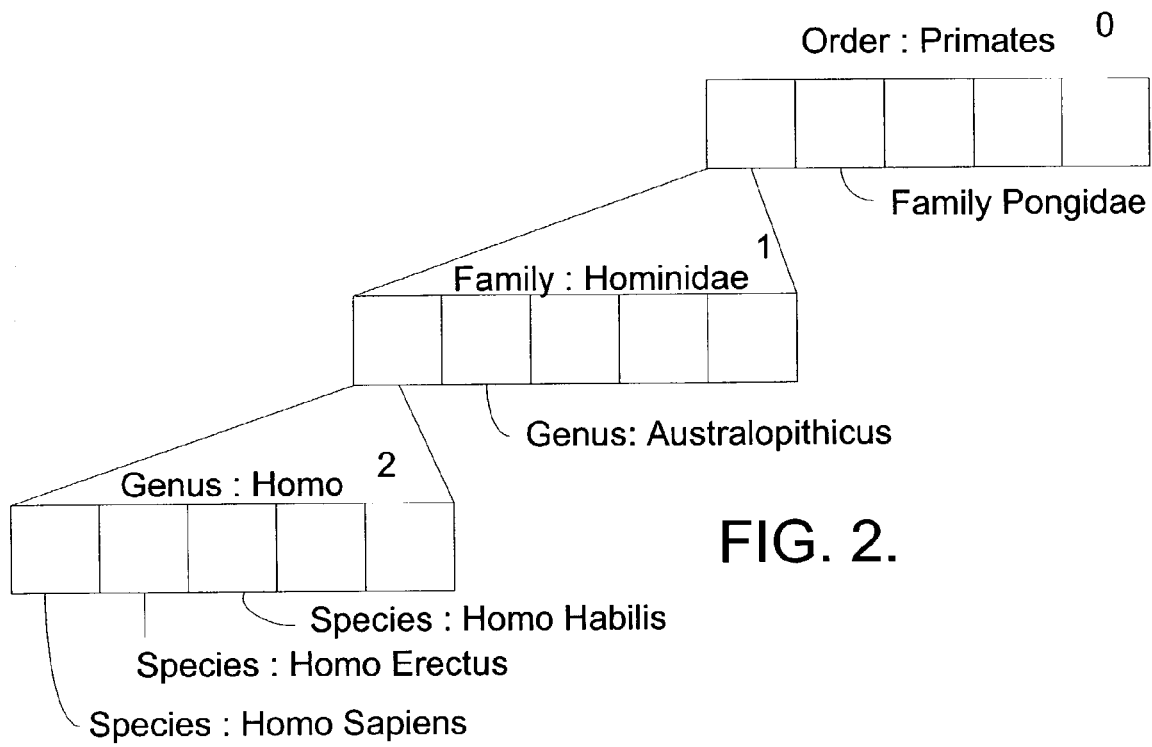
FIG. 2 is an exemplary memory representation of a subset of the informational items shown in FIG. 1.

In FIG. 2, a subset of data that has undergone the BIRCH algorithm is shown. Also shown is an exemplary illustration of how the associated data structure might be represented in memory. This particular illustration represents the hierarchical cluster shown in FIG. 1, cluster 106 classification, Order 106A and summarization Primates 106B. Referring back to FIG. 1 and the concept of ranking scores to improve the BIRCH algorithm, additional information is available to efficiently integrate with other subsequent processing. For example, the clusters 107-113 would have the key points shown in Example 1 below for each level of the hierarchy.

By selecting the families Hominidae 107 and Pongidae 108 and all the descendant clusters 109-113, the following key points would be selected to describe the cluster (clusters 107-108 represented by 0, clusters 109-110 represented by 1, and clusters 111-113 represented by 2):

EXAMPLE 1

0: Pongidae, Homo Sapiens, Homo Erectus, Homo Habilis, Australopithicus

1: Homo Sapiens, Homo Erectus, Homo Habilis, Australopithicus

2: Homo Sapiens, Homo Erectus, Homo Habilis

Scores may be assigned based on the varied usage of the above key points or terms within the clustered document. For instance, assume that scores are assigned. In other words, assume that each of the terms of Example 1 appears within a document the number of times shown in brackets:

EXAMPLE 2

0: Pongidae (1), Homo Sapiens (30), Homo Erectus (3), Homo Habilis (7), Australopithicus (15)

1: Homo Sapiens (30), Homo Erectus (3), Homo Habilis (7), Australopithicus (15)

2: Homo Sapiens (30), Homo Erectus (3), Homo Habilis (7)

Based on this artificial example, Homo Sapiens has the highest usage in the clustered documents, followed in order by Australopithicus, Homo Habilis, Homo Erectus, and finally Pongidae. Ranking scores will thus be assigned to reflect the usage of the terms within the clustered documents.

The process of taking new information and sorting the information into a set of identified categories is known as classification. Classification algorithms perform in many different ways, with the better ones being those that place new information into categories easily understood by humans. An existing classification algorithm of this type is RIPPER. RIPPER works by building a series of logic conditions on the available features of a data set to arrive at a set of rules. Traditionally, RIPPER rules are learned by analyzing a non-hierarchical clustered data set.

However, an embodiment of the present invention uses the key points at each level of a BIRCH hierarchy to generate an exclusive set of classification rules. This classification begins with the BIRCH root cluster. Subsequent sub-clusters are determined by matching the unique descriptors in the RIPPER style format, in other words, appropriate subsequent sub-clusters are repeatedly identified until the RIPPER rules generated by the BIRCH key point identifiers no longer match or distinguish sub-clusters. Each matched unique descriptor becomes the cluster for the new information. The subset of the BIRCH features from Example 1 can be used to create a hierarchical modification to the standard RIPPER approach with the following rules:

EXAMPLE 3

This example shows the subsection of rules within the Order: Primates cluster (i.e., FIG. 1 cluster 106):

If DOCUMENT contains "Homo Sapiens" OR "Homo Erectus" OR "Homo Habilis" OR "Australopithicus" then
{
Place DOCUMENT in: Family Hominidae
If DOCUMENT contains "Homo Sapiens" OR "Homo Erectus" OR "Homo Habilis" then
{
Place DOCUMENT in: Genus Homo
}
else if DOCUMENT contains "Australopithicus" then
{
Place DOCUMENT in: Genus Australopithicus
}
}
else if DOCUMENT contains "Pongidae" then
{
Place DOCUMENT in: Family Pongidae
}

In a further embodiment of the present invention, the pruning aspect of a standard RIPPER algorithm is applied to the hierarchically modified RIPPER/BIRCH combination resulting in a succinct summary of the items matching a classification rule. As such, a modification to the rules, shown above in Example 3, is warranted, wherein the rules are shortened to contain only the necessary information to describe each cluster. These rules can be set out as follows:

EXAMPLE 4

If DOCUMENT contains "Homo" OR "Australopithicus" then
{
Place DOCUMENT in: Family Hominidae
If DOCUMENT contains "Homo" then
{
Place DOCUMENT in: Genus Homo
}
else if DOCUMENT contains "Australopithicus" then
{
Place DOCUMENT in: Genus Australopithicus
}
}
else if DOCUMENT contains "Pongidae" then
{
Place DOCUMENT in: Family Pongidae
}

Those skilled in the art will recognize that some new data may not match any of the rules generated by this approach. Depending on the desired implementation, these items could fall into a "catch-all" category or be placed into any of the existing categories arbitrarily and would still be considered within the scope of this invention.

Another embodiment of this invention provides a subject data store in a more human readable format than the standard ordered lists that are so common with existing search engines. This embodiment of the invention presents searched results as labeled clusters. This way people can more quickly select the aspect of a result that is of the most interest, instead of forcing them to browse the entire search result set. Thus, the use of standard searching techniques paired with the clustering+classification+summarization method, described in this invention, would identify not just a set of result items at the highest level of detail. It would also provide the ability to describe and label the clusters within the data store in which these result items are organized.

Figure 3:
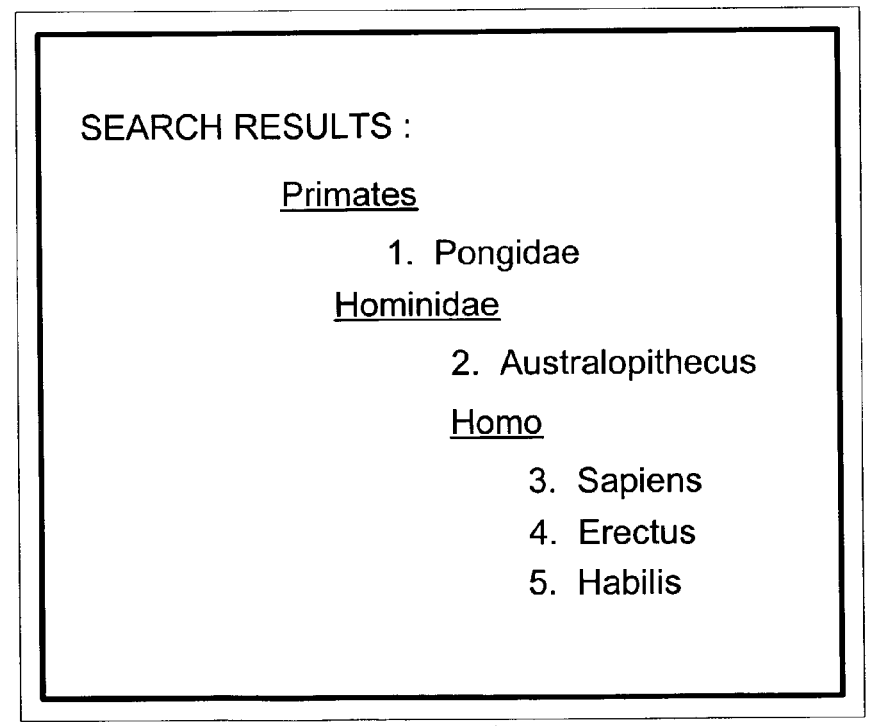
FIG. 3 illustrates the presentation of information that was sought by a query.

In addition, one could conduct a search on not only the information items, but also on the cluster descriptions. FIG. 3 shows one possible presentation of the information from Examples 1 and 3. This illustration assumes that an appropriate search query was used to find these results. The numerals (1, 2, 3, 4 and 5) identify selectable documents in the list. The labels for the clusters and possibly the documents are generated from the summarization approach that was discussed earlier.

Figure 4:
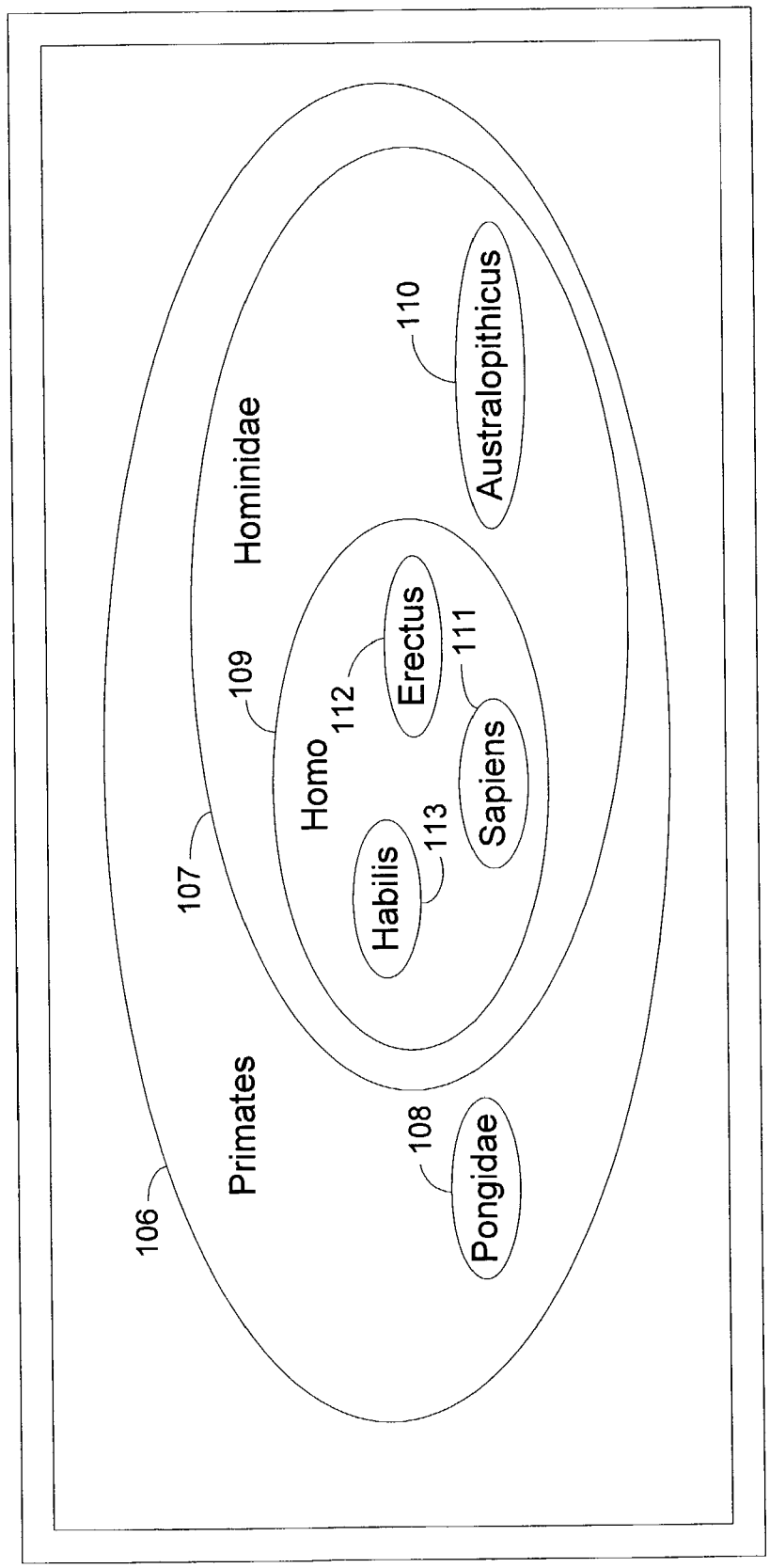
FIG. 4 illustrates a graphical representation of a fully expanded representation of information as an alternative to that shown in FIG. 3.

Yet another embodiment of the present invention provides a further improvement over typical textual presentation of clustered and summarized information by presenting the information in a graphical manner. FIG. 4 shows one possible graphical presentation of a fully expanded representation of the information from Examples 1 and 3 as an alternate presentation of the information shown in FIG. 3. Just as in FIG. 3, each node contains a selectable document, and the labels are generated through the summarization approach. In the presentation of FIG. 4, the individual items in each cluster are plotted in multiple dimensions. The items are also grouped by proximity with other items in the same cluster. For example, the Genus Homo 109 comprises a cluster of Habilis 113, Erectus 112 and Sapiens 111, as such the plot representation of Genus Homo 109 encompasses all three clusters. Similarly, Primates 106 encompasses Pongidae 108 and Hominidae 107 at one level. Hominidae 107 encompasses Homo 109 and Australopithicus 110. These clusters may or may not be expanded or collapsed to any level of detail depending on the desired implementation.

Another embodiment of the present invention provides a method for graphically detailing the inter-relationship between individual informational items and clusters by displaying the links between them. While the possibility exists to display all the links between information items based on relationship strength, or any other types of relationships that might be available, a better approach for complexity reduction would be to determine which links are cognitively important to the user.

Figure 5A:
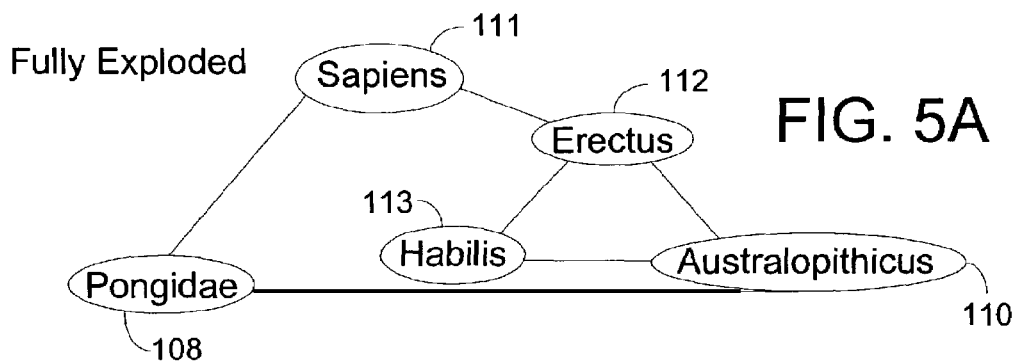
FIG. 5A is a pictorial representation of a fully expanded set of data.
Figure 5B:
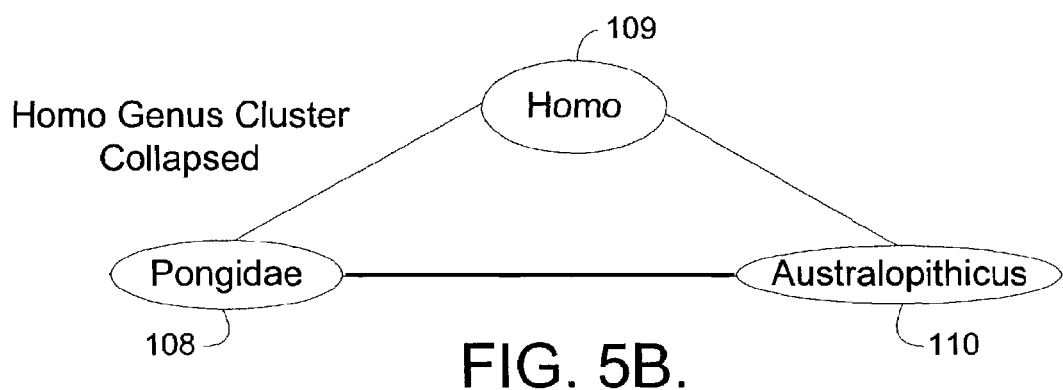
FIG. 5B is a pictorial representation of a collapsed cluster from FIG. 5A.
Figure 5C:
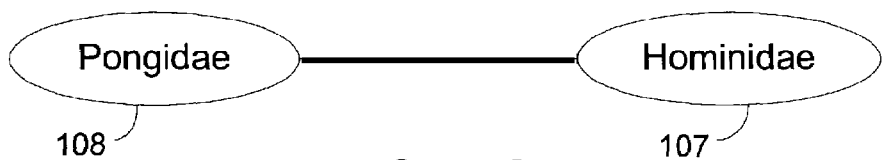
FIG. 5C is a pictorial representation of a collapsed cluster from FIG. 5B.
Figure 5D:
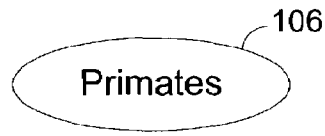
FIG. 5D is an exemplary pictorial representation of a collapsed cluster from FIG. 5C.

The PATHFINDER, an algorithm which is not discussed in any detail in this document, provides a way to present related information to humans in a manner that is well adapted to how humans are prepared to process the information. The present invention adapts this algorithm to the hierarchical clustering approach through analyzing those links that connect clusters, while ignoring those links that are within clusters. The fully hierarchical structure of the present invention is thus realized by running the PATHFINDER algorithm at each level of the hierarchy. FIGS. 5A-5D illustrate how a graphical representation from a hierarchical PATHFINDER approach, or any of the other described approaches, might appear when applied to the data Examples 1 to 4 discussed above. More particularly, FIG. 5A shows a fully exploded view of the information that was contained in Level 0 of Example 1 (i.e. clusters 108-113 of FIG. 1). FIG. 5B shows a subsequent view of FIG. 5A in which the genus HOMO cluster 109 is in a collapsed state. FIG. 5C shows what might appear if FIG. 5B had the family Hominidae 107 collapsed, and finally FIG. 5D shows the primate order 106 collapsed.

Feature Selection

Another embodiment of the present invention would be to augment it with a natural language feature selection pre-processing step and a feedback loop during clustering. The first improvement, natural language feature selection, enables the invention to better extract meaningful linguistic terms from the input data set.

Figure 6:
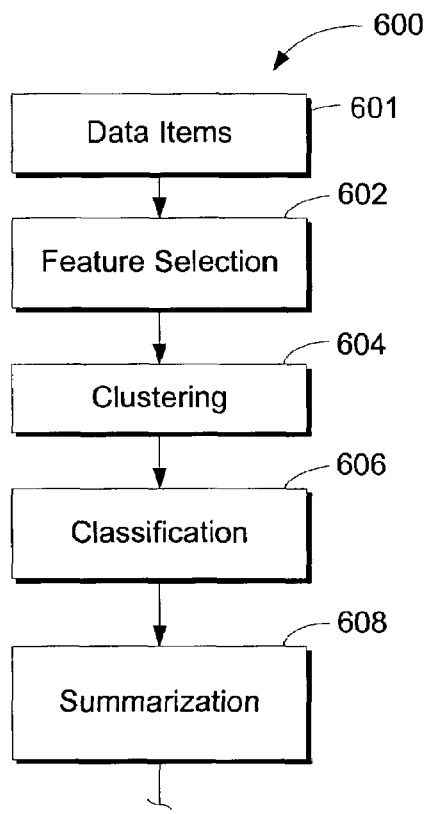
FIG. 6 is a pictorial representation of a block diagram of an exemplary system representing one possible ordering of the feature selection, clustering, classification, and summarization steps.

FIG. 6 is an illustration of an example system consisting of one possible combination 600 of the set of natural language feature selection, clustering, classification and summarization algorithms. The first stage 602 of the example system consists of a natural language feature selection method. The inputs to this stage consist of a set of documents or data items 601, each with a plurality of associated document attributes and a optional ranked set of pre-identified terms (see FIG. 8A and FIG. 8B). The optional ranked set of terms could be gathered either automatically by examining the access logs of an informational database or a set of predefined ranked terms supplied by an alternate external source.

The output of the first stage is a plurality of ranked terms for each document and is passed to the second stage 604. The second stage 604 of the example system consists of a clustering algorithm as described previously with the addition of an output feedback loop. The output of the second stage 604 is, as previously described, a representation of the hierarchical structure of the clustering algorithm and is passed to the third stage 606 classification algorithm. The third stage 606 consists of a classification algorithm as described previously. The output of the third stage 606 is a representation of learned classification rules and is passed to the fourth stage 608 summarization. The fourth stage 608 summarization step remains as described previously.

Example Feature Selection Method

Figure 7:
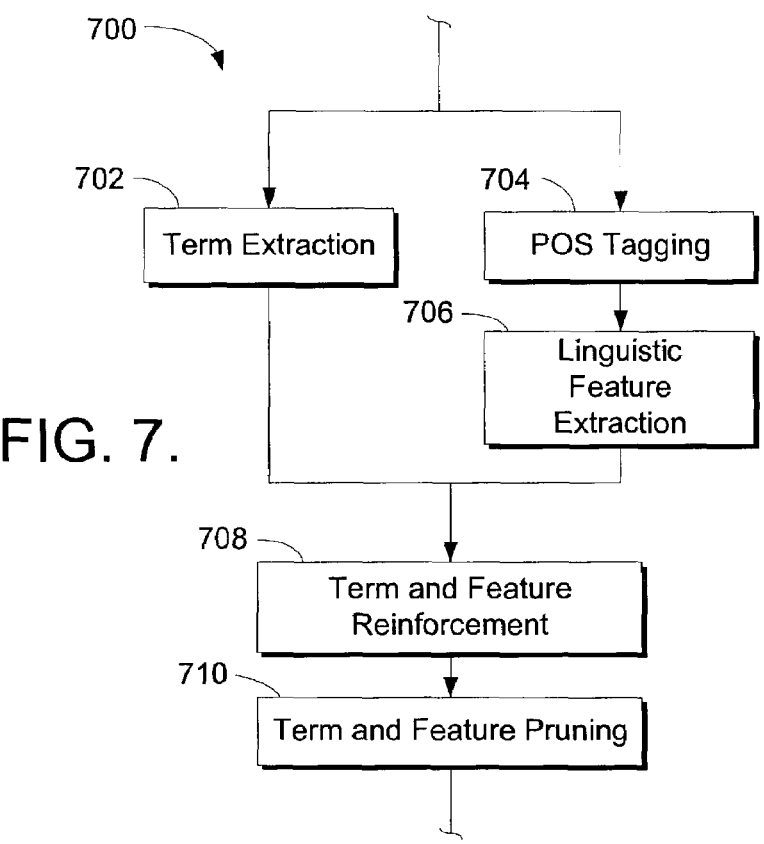
FIG. 7 is a pictorial representation of a block diagram of an exemplary feature selection method.

FIG. 7 is an illustration of an exemplary feature selection method. Note that this example is described with respect to an input data set consisting of human readable text in some appropriate representation. FIG. 8A illustrates several example members 802 and 804 of such a data set. Each example contains a number of subparts or attributes. Other feature selection methods could be applied as appropriate to the data set.

In element 702 of FIG. 7, each document in the input data set is parsed and divided into a list of ranked terms, each with a frequency of occurrence score. The list of ranked terms for each document is the output of element 702.

Element 702 of FIG. 7 represents a natural language part of speech (POS) tagging algorithm; many such algorithms are known. The input data set is passed into the POS tagger, and the output consists of an annotated representation of the original input data set. Each linguistic term of the input set is assigned a tag representing its part of speech. Refer to FIG. 9A, for example, for output of a POS tagger.

It has been found that a trainable algorithm, whether "rule-based," "probabilistic/statistical" or "lazy," may, in many circumstances, be preferable. Nonetheless, non-trainable language specific taggers may be used with this embodiment.

Satisfactory "rule-based" POS taggers include Brill and uTBL. Examples of "probabilistic/statistical" POS taggers include Kupiec, Claws, QTag, TnT, TreeTagger and xrce/mltt. A suitable "lazy" POS taggers is MBT. Non-trainable language specific taggers may include Morphy (German); CMU Link Grammar Parser; EngCG; and TOSCA/LOB.

Typically POS tagging algorithms are specific to a particular language, but a reasonable implementation would be for the system to have a different POS tagger for each language and use the appropriate POS tagger for the current language. The choice of a POS tagger could be made with either a language attribute supplied with the input data set, or automatically using known language identification techniques. Element 706 of FIG. 7 consists of a linguistic feature identification step. This step takes the part of speech annotated input data set and identifies important relevant linguistic features of each element of the data set. Different linguistic features can be given different strengths. An exemplary list of relevant extracted linguistic features is shown in FIG. 9B.

The outputs of FIG. 7 elements 702 and 706 are merged and input into element 708. Element 708 consists of an optional feature reinforcement stage, where a ranked list of terms (see FIG. 8B) is used to reinforce the merged output of 702 and 706. For each term in the ranked list, matching terms from the output set are given a numerical boost to the strength value associated with each term. This step allows precise terms to be given a higher weight, and thus a higher importance for later stage algorithms. Element 710 consists of an optional feature pruning step where features of low strength are eliminated from the output set. The feature pruning step can aid later stage algorithms both by reducing the size of the data set and eliminating noise from the data set.

Adaptive Clustering Algorithms

Figure 10:
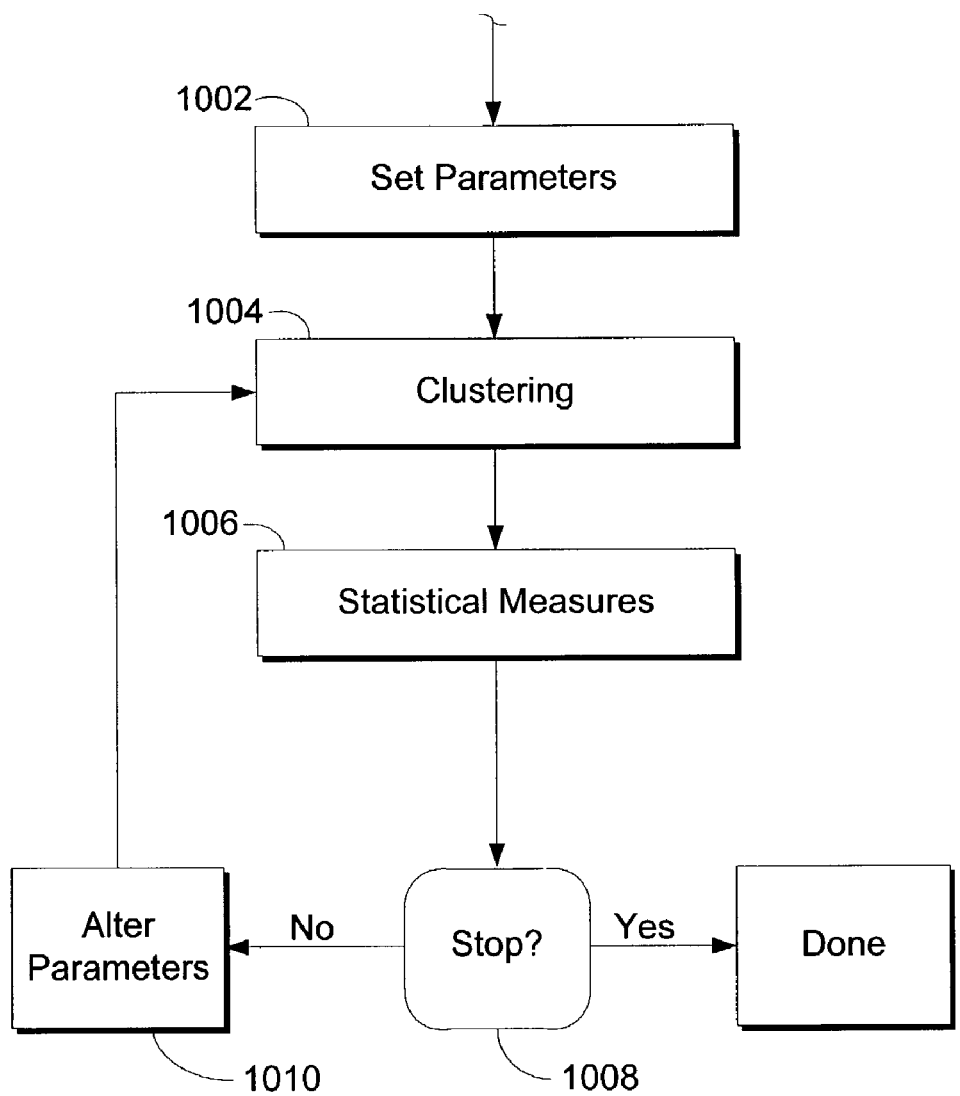
FIG. 10 is a pictorial representation of an adaptive clustering algorithm.

FIG. 10 illustrates a method of adaptive clustering. Each data set has particular characteristics that can be more effectively utilized with a adaptive clustering approach. A typical clustering algorithm has a plurality of parameter settings that can have a great influence on the output characteristics. Those output characteristics can be quantified with a variety of statistical measurements specific to the particular representation of the clustering algorithm output. The statistical measurements are then analyzed to determine if the algorithm parameters should be adjusted or the algorithm can terminate.

Element 1002 of FIG. 10 represents the act of setting the plurality of parameters specific to a particular clustering algorithm. Element 1004 represents the main stage of the clustering algorithm. Element 1006 consists of processing the clustering algorithms output with a variety of statistical methods. An example of one such statistical measurement would be an average number of documents (or other data set elements) per group in the output.

A set of reasonable rules 1008 could be devised specific to the intended task to determine if the output of the clustering algorithm meets a quality goal. If so, then the adaptive clustering algorithms stops. If not, a second set of rules could be devised to alter the plurality of parameter settings for the clustering algorithm with Element 1010. The clustering algorithm of Element 1004 is then restarted. This process continues until the clustering algorithm meets the quality rules or until an optional deadline has been reached.

While the invention has been described with reference to the exemplary embodiments thereof, those skilled in the art will be able to make various modifications to the described embodiments of the invention without departing from the true spirit and scope of the invention. The terms and descriptions used herein are set forth by way of illustration only and are not meant as limitations. In particular, although the method of the present invention has been described by examples, the steps of the method may be performed in a different order than illustrated or simultaneously. Those skilled in the art will recognize that these and other variations are possible within the spirit and scope of the invention as defined in the following claims and their equivalents.

We claim:

1. A computer-implemented mapping method for categorizing a plurality of informational items in an information retrieval system, the method comprising the steps of;

clustering by identifying one or more groupings of the informational items into one or more clusters, wherein said clustering is extended by adding an adaptive method comprising the steps of:

application of said clustering, statistical evaluation of said clustering output for quality, usage of said statistics to alter the plurality of clustering parameters, re-running of clustering algorithm, and continuing this process until some stopping condition is met;

classifying said clusters by identifying rules to assign the informational items to a specific one of said clusters without utilizing information from externally provided hierarchical representations;

summarizing each of said clusters by determining human readable descriptive titles to uniquely identify each of said clusters; and storing said human readable descriptive titles, wherein said clustering, classifying and summarizing are all performed on a given set of data in no particular order.

2. A general purpose computer programmed to perform the method recited in claim 1.

3. The computer-implemented method, as recited in claim 1, wherein said feature selection, adaptive clustering, classifying and summarizing are all performed on a given set of data in no particular order.

4. A general purpose computer programmed to perform the method recited in claim 3.

5. A computer-implemented mapping method for categorizing a plurality of informational items in an information retrieval system, the method comprising the steps of:

clustering by identifying one or more groupings of the informational items into one or more clusters, wherein said clustering includes an extension to BIRCH clustering algorithm, said extension comprising;

incorporating into subsequent classification and summarization steps one or more key points that define a bin of information items;

augmenting said key points with ranking scores to better identify the most important items within a pool of informational items for subsequent classification and summarization;

classifying said clusters by identifying rules to assign the informational items to a specific one of said clusters without utilizing information from externally provided hierarchical representations; and summarizing each of said clusters by determining human readable descriptive titles to uniquely identify each of said clusters.

\* \* \* \* \*

UNITED STATES PATENT AND TRADEMARK OFFICE
CERTIFICATE OF CORRECTION

| | |
|---|---|
| PATENT NO. | : 7,478,103 B2 |
| APPLICATION NO. | : 10/226542 |
| DATED | : January 13, 2009 |
| INVENTOR(S) | : Douglas K. Warner, James Neal Richter and Bikramjit Banerjee |

Page 1 of 1

It is certified that error appears in the above-identified patent and that said Letters Patent is hereby corrected as shown below:

On the title page Item (75) Inventors:

delete "Douglas K. Warner, Gallatin, MT (US)" and replace with "Douglas K. Warner, Bozeman, MT (US)";
delete "James Neal Richter, Gallatin, MT (US)" and replace with "James Neal Richter, Bozeman, MT (US)";
delete "Bikramjit Banerjee, Gallatin, MT (US)" and replace with "Bikramjit Banerjee, New Orleans, LA (US)"

Signed and Sealed this

Twenty-fourth Day of March, 2009

JOHN DOLL
*Acting Director of the United States Patent and Trademark Office*